United States Patent

Nishimine et al.

[11] Patent Number: 5,855,860
[45] Date of Patent: Jan. 5, 1999

[54] METHOD FOR PORIFYING FINE PARTICULATE SILICA

[75] Inventors: Masanobu Nishimine; Yoshio Tomizawa; Hidekazu Uehara; Kiyoshi Shirasuna; Susumu Ueno, all of Annaka, Japan

[73] Assignee: Shin-Etsu Chemical Co., Ltd., Tokyo, Japan

[21] Appl. No.: 848,271

[22] Filed: Apr. 29, 1997

Related U.S. Application Data

[63] Continuation-in-part of Ser. No. 549,190, Oct. 27, 1995, abandoned.

[30] Foreign Application Priority Data

Oct. 27, 1994 [JP] Japan .................................. 6-288998

[51] Int. Cl.$^6$ .................................................. C01B 33/12
[52] U.S. Cl. .......................................... 423/337; 423/336
[58] Field of Search ..................................... 423/337, 336

[56] References Cited

U.S. PATENT DOCUMENTS 3,043,659  7/1962  Hughes et al. ............................ 23/182

FOREIGN PATENT DOCUMENTS

| 709340A1 | 5/1966 | European Pat. Off. . |
| A0044903 | 6/1982 | European Pat. Off. . |
| 1150955 | 4/1961 | Germany . |
| 4746274 | 11/1972 | Japan . |
| 4813832 | 5/1973 | Japan . |
| A1197271 | 7/1970 | United Kingdom . |

Primary Examiner—Deborah Jones
Attorney, Agent, or Firm—Birch, Stewart, Kolasch & Birch, LLP

[57] ABSTRACT

Crude fumed silica resulting from pyrogenic hydrolysis is purified by continuously feeding particulate silica and steam or a mixture of steam and air in a steam/air volume ratio of at least 1/2 through an upright column from its bottom toward its top for forming a fluidized bed within the column at a gas linear velocity of 1 to 10 cm/sec. and a temperature of 250° to 400° C., whereby steam deprives the particulate silica of the halide borne thereon, and removing fine particulate silica from which the halide has been eliminated from the top of the column. Using a simple apparatus, pure fine particulate silica is collected at a low cost of energy consumption.

10 Claims, 2 Drawing Sheets

METHOD FOR PORIFYING FINE PARTICULATE SILICA

CROSS REFERENCE TO RELATED APPLICATION

This application is a continuation-in-part of application Ser. No. 08/549,190 filed on Oct. 27, 1995, now abandoned, the entire contents of which are hereby incorporated by reference.

BACKGROUND OF THE INVENTION

1. Field of the Invention

This invention relates to a method for purifying fine particulate silica such as fumed silica by eliminating halide therefrom.

2. Prior Art

Fumed silica is widely used in the art as a filler for silicone elastomers and various other resins. In general, fumed silica is prepared by pyrogenic hydrolysis of silicon-containing halides. Since fumed silica has high surface activity and a large specific surface area, it has adsorbed thereon a substantial amount of hydrogen halide resulting from pyrogenic hydrolysis as a by-product. Fumed silica bears halogen in a chemically bonded state if the reaction is incomplete. It is undesirable to use fumed silica bearing a noticeable amount of halogen as a filler without treatment. Usually, such fumed silica is used after deacidifying treatment is carried out for eliminating the halide.

Conventionally, fumed silica is deacidified by using an endless steel belt or a rotary column with transfer means for bringing fumed silica in contact with wet air at 200° to 500° C. as disclosed in Japanese Patent Publication (JP-B) No. 46274/1972. Although deacidification can be done at relatively low temperatures, the apparatus includes mechanical movable parts which tend to fail during use in a hot acidic corrosive atmosphere.

Another known deacidifying method is countercurrent contact between fumed silica and wet air as disclosed in JP-B 13832/1973. Although this method avoids to place mechanical movable parts in a hot acidic corrosive atmosphere and allows for use of a relatively simple apparatus, the method is less efficient in that separation of coarse particles cannot be accomplished concurrently with the deacidification. The treating temperature is relatively high. JP-B 13832/1973 describes a comparative example using a parallel flow fluidized layer. It is described that this parallel flow fluidized layer is at a temperature of 600° to 800° C. Use of such high temperature is impractical because the material of the apparatus and the heat source are limited.

SUMMARY OF THE INVENTION

Therefore, an object of the present invention is to provide a method for purifying fine particulate silica which uses a relatively simple apparatus in the form of a fluidized bed, carries out deacidification in a forward flow fluidized bed at relatively low temperatures, and concurrently accomplishes separation of coarse particles.

We have found that deacidification of particulate silica can be carried out at relatively low temperatures by feeding particulate silica and a higher proportion of steam to form a forward flow fluidized bed. More particularly, when steam or a mixture of steam and air in a volume ratio of 0.5/1 or higher is fed along with particulate silica so as to provide a gas linear velocity of 1 to 10 cm/sec. to form a forward flow fluidized bed with particulate silica, effective deacidification takes place even at a fluidized bed temperature of 250° to 400° C. The thus established fluidized bed apparently reduces silica agglomeration therein, promotes diffusion of halide to the deacidifying gas or steam, and thus achieves efficient treatment.

According to the present invention, there is provided a method for purifying fine particulate silica comprising the steps of continuously feeding halide-bearing fine particulate silica and steam or a mixture of steam and air in a volume ratio of 0.5/1 or higher through an upright column from its bottom toward its top for forming a fluidized bed within the column at a gas linear velocity of 1 to 10 cm/sec. and a temperature of 250° to 400° C., whereby steam causes the halide to be eliminated from the fine particulate silica, and removing the fine particulate silica from which the halide has been eliminated from the top of the column.

BRIEF DESCRIPTION OF THE DRAWINGS

These and further features of the present invention will be apparent with reference to the following description and drawings, wherein.

DETAILED DESCRIPTION OF THE PREFERRED EMBODIMENTS

Figure 1:
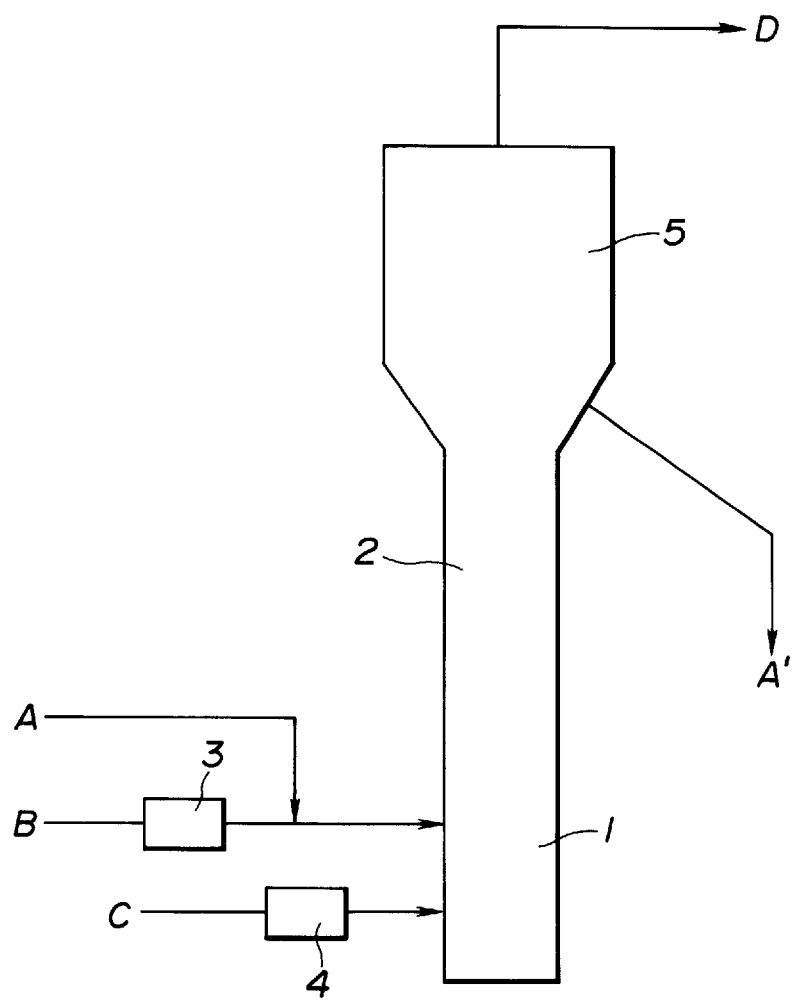
FIG. 1 schematically illustrates a system used in the practice of the method of the invention, and FIG. 2 schematically illustrates a continuous system of producing and purifying fine particulate silica.

Referring to FIG. 1, the method for purifying fine particulate silica according to the present invention uses a generally upright column 1 for forming a fluidized bed therein. To the bottom of the column 1 are connected a silica line A for providing crude fine particulate silica, an air line B for providing air, and a steam line C for providing steam or steam and air. To the top of the column 1 is formed a space 5 for preventing silica particles from scattering and stabilizing the surface of silica particles which is, in turn, connected to a silica removal line A' and a gas discharge line D. Crude fine particulate silica, typically fumed silica and steam or steam and air are fed through the lines A, B and C into the column 1 at the bottom so as to flow vertically upward from the bottom toward the top. A forward flow fluidized bed 2 is created in the column 1. The treated or deacidified fine particulate silica is removed from the column top to line A'. Preheaters 3 and 4 are disposed in the lines B and C. It is noted that the line C is described as a steam line although a mixture of steam and air may be passed through the line C.

The crude fine particulate silica to be treated is typically fumed silica and may have a mean particle size of 5 to 50 nm, especially 5 to 20 nm, a specific surface area of 100 to 400 $m^2/g$, especially 200 to 400 $m^2/g$ by BET method and a chlorine content of 1,000 to 10,000 ppm, especially 1,000 to 8,000 ppm.

The crude fine particulate silica to be treated is one prepared by the process comprising the steps of:

(A) subjecting a gas stream consisting essentially of an organohalosilane or organohalodisilane to pyrogenic hydrolysis in a diffusion flame of a combustible gas capable of burning to release water vapor (typically hydrogen gas, methane, propane or gaseous methanol) and a free oxygen-containing gas (typically air), and (B) feeding the combustible gas capable of burning to release water vapor in a sufficient amount to continue combustion of the organohalosilane or organohalodisilane.

In the above process for preparing fine particulate silica, the organohalosilanes or disilanes having a boiling point of up to 200° C. are preferred because they must be gasified for supply to the burner. Exemplary organohalosilanes include methyltrichlorosilane, methyldichlorosilane, trimethylchlorosilane, and dimethyldichlorosilane, and exemplary organohalodisilanes include 1,2-dimethyltetrachlorodisilane, 1,1,2-trimethyltrichlorodisilane, 1,1,2,2-tetramethyldichlorodisilane, 1,1,1,2-tetramethyldichlorodisilane. Preferred are organohalosilanes and disilanes which are available as by-products from the synthesis of dimethyldichlorosilane from metallic silicon and an organohalide, with the methyltrichlorosilane being especially preferred.

The combustible gas capable of burning to release water vapor ($H_2O$) is typically hydrogen gas while methane, propane and gaseous methanol are acceptable. The combustible gas is essential for effecting hydrolysis of silane and providing active OH groups to the silica surface. It also serves as a source for allowing a stable flame to continue.

The free oxygen-containing gas is typically air from the economic aspect.

The combustible gas capable of burning to release water vapor is fed in a sufficient amount to continue combustion of the organohalosilane or organohalodisilane. Preferably, the combustible gas is fed in an amount of 0.8 to 5 mol, more preferably 0.8 to 4 mol per mol of the organohalosilane or organohalodisilane. If the combustible gas is fed in an amount of less than 0.8 mol per mol of the organohalosilane or organohalodisilane, the flame would become too short, resulting in insufficient conversion of silanes into silicas. Thus unreacted silanes are left. If the combustible gas is fed in an amount of more than 5 mol, the flame temperature would become too high. A large excess of diluent gas such as air would be required.

The free oxygen-containing gas is preferably fed in an amount of 0.5 to 7 mol, more preferably 0.6 to 5 mol, as an amount of free oxygen, per mol of the organohalosilane or organohalodisilane. If the free oxygen-containing gas is fed in an amount of less than 0.5 mol as an oxygen, the resulting silica would become dark. If the free oxygen-containing gas is fed in an amount of more than 7 mol as an oxygen, the flame temperature would become too low. Thus unreacted silanes which are not converted into silicas are left.

Any desired one of conventional well-known diffusion combustion methods may be used for subjecting the halosilane or halodisilane to pyrogenic hydrolysis in a diffusion flame. Any of well-known burners may be used for burning the reactants. For example, simple triple or quadruple tube burners may be used. Any burner with diffusion combustion capability is useful.

The preferable burner is a quadruple tube burner in which the organohalosilane or organohalodisilane is fed through a first central tube, a portion of the free oxygen-containing gas is fed through a second tube, concentric to the first tube, the combustible gas is fed through a third tube, concentric to the second tube, and a remainder of the free oxygen-containing gas is fed through a fourth tube, surrounding all of the first, second and third tubes. The fourth burner may be concentric around the third tube.

The organohalosilane or disilane, air (the free oxygen-containing gas) and hydrogen gas (the combustible gas) are fed to a reaction zone in a concentrically separate manner to subject the organohalosilane or disilane to combustion in the reaction zone, thereby producing fine particulate silica.

In one preferred embodiment, the organohalosilane or disilane is fed to the center tube at a flow rate of about 0.1 to 10 kg/h, especially about 1 to 5 kg/h, air is fed to the air feed tube at a flow rate of about 0.02 to 10 $Nm^3/h$, especially about 0.2 to 5 $Nm^3/h$, hydrogen is fed to the hydrogen feed tube at a flow rate of about 0.02 to 10 $Nm^3/h$, especially about 0.2 to 5 $Nm^3/h$, and air is further fed to the outer tube at a flow rate of about 0.02 to 10 $Nm^3/h$, especially about 0.2 to 5 $Nm^3/h$.

In the process for purifying the crude particulate silica as described above, the gas used to form the fluidized bed 2 is either steam alone or steam and air, the latter being typical.

Any of well-known methods such as pneumatic transportation may be employed for admitting crude fine particulate silica into the column 1 at its bottom. Typically silica is admitted into the column 1 by carrying it with air along line B as shown in FIG. 1. The amount of silica fed may be properly determined. Silica is preferably fed so as to provide 0.0002 to 0.02 g of silica, more preferably 0.001 to 0.01 g of silica per cubic centimeter of the fluidized bed because effective treatment is expectable in this range.

As the gas for forming the fluidized bed 2 for treating crude fine particulate silica, steam, typically a mixture of steam and air is admitted into the column 1 at its bottom as shown in FIG. 1. According to the present invention, the proportion of steam is made high. Where air is used to carry silica to the column interior, the amount of entire steam is at least 0.5 volume, preferably 0.8 volume, more preferably at least 1 volume, most preferably more than 1 volume per volume of entire air. That is, a gas mixture of steam and air in a volume ratio of at least 0.5/1 is fed to form the fluidized bed 2. If the proportion of steam is below this limit, effective deacidifying treatment does not take place and the temperature of the fluidized bed must be increased.

The fluidized bed 2 is formed such that the fluidized bed-forming gas consisting of steam or steam and air has a linear velocity of 1 to 10 cm/sec., preferably 3 to 5 cm/sec. A linear velocity below this range fails to achieve full fluidization whereas above the range, silica particles are scattered away.

Also the fluidized bed 2 is maintained at a temperature of 250° to 400° C., preferably 250° to 350° C. Temperatures below 250° C. lead to very slow deacidification, require a longer time to complete the treatment, and are thus impractical. Temperatures above 400° C. can damage the material of the column 1, require a special heat source and are disadvantageous from the aspect of energy cost. More particularly, operation at 400° C. or lower is required if local overheating is taken into account. If deacidification is possible at 350° C. or lower, hydrocarbons can be used as thermal media. As compared with thermal media of inorganic salts, the use of hydrocarbon media eliminates operational trouble and reduces the system cost. Since the present invention enables operation at 350° C. or lower, these advantages are available as well as a reduced cost of energy.

In order to maintain the fluidized bed at the selected temperature, the zone of the column 1 where the fluidized bed is formed is provided with heating means (not shown). It is also recommended to preheat steam and air prior to entry to the column 1. The preheaters 3 and 4 are located in the lines B and C to this end.

In the thus created fluidized bed 2, deacidification is carried out on the crude fine particulate silica. That is, steam traps or catches halides such as hydrogen halides which have been adsorbed to silica particles. The treating time is preferably ½ to 120 minutes, especially 1 to 20 minutes. Through such treatment, pure silica having a halogen content of 20 ppm or less, especially 15 ppm or less is readily available.

The thus deacidified or purified silica is removed from the top of the column 1 and collected through the line A'. The gas consisting of steam or steam and air from which silica has been separated is discharged from the column top to the line D. In order to prevent silica particles from scattering and stabilize the surface of powder, the space 5 of dilated diameter is disposed above the fluidized bed-forming zone of the column 1 as a precipitation/separation section.

As mentioned above, the present invention achieves the elimination of halide impurities from fine particulate silica at a reduced cost of energy using a simple apparatus. At the same time as deacidification takes place, fine particles which are lifted to the column top and collected through the outlet to the line A' are separated from large particles which do not reach the column top.

In this case, when the crude fine particulate silica is produced by the pyrogenic hydrolysis described above, the silica can be continuously introduced into the purifying apparatus shown in FIG. 1.

Figure 2:
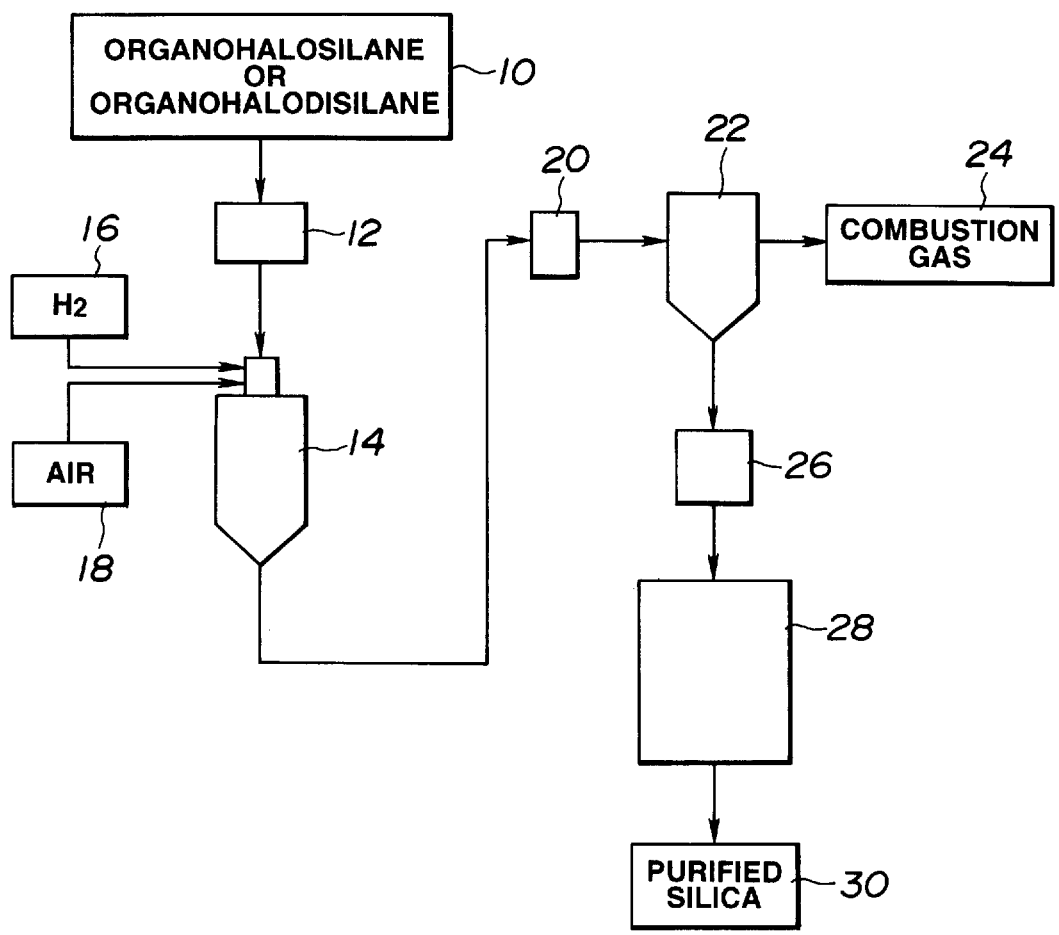

FIG. 2 shows the continuous process for producing and purifying fine particulate silica.

An organohalosilane or organohalodisilane 10 is introduced into a vaporization apparatus 12 to vaporize the organohalosilane or disilane. The gaseous organohalosilane or disilane is continuously introduced into a pyrogenic hydrolysis apparatus 14 with a combustible gas capable of burning to release water vapor (such as hydrogen) 16 and a free oxygen-containing gas (such as air) 18 in the manner as explained above, thereby obtaining fine particulate silica (fumed silica) by pyrogenic hydrolysis. The resulting silica is then continuously introduced via an agglomerator 20 into a silica separating apparatus (such as a cyclone) 22 to discharge the combustion gas 24 therefrom. Thereafter, the silica is continuously introduced via a silica delivery pump 26 into a silica purifying apparatus 28 as shown in FIG. 1 thereby obtaining purified fine particulate silica 30.

EXAMPLE

Examples of the present invention are given below by way of illustration and not by way of limitation.

Example 1

A column having an inner diameter of 8 cm was set upright as shown in FIG. 1. Its fluidized bed zone was heated and maintained at a temperature of 300° C. From the bottom of the column, 140 g/h of fumed silica resulting from pyrogenic hydrolysis (specific surface area 195 $m^2$/g, chlorine content 1,162 ppm), 0.15 $Nm^3$/h of air preheated to 300° C., and 0.15 $Nm^3$/h of steam preheated to 300° C. were continuously fed into the column to form a fluidized bed within the column at a linear velocity of 3.4 cm/sec. and a temperature of 300° C. where the fumed silica was deacidified. Part of air was used to carry the fumed silica into the column. The thus purified fumed silica was separated from the used gas at the column top and taken out of the column. The time of deacidifying treatment was 7 minutes. By the treatment, the chlorine content of fumed silica was reduced to 14 ppm, indicating satisfactory deacidification.

Example 2

Using the apparatus shown in FIG. 2, 700 g/h of methyltrichlorosilane which was previously vaporized in a vaporization apparatus was continuously introduced into a pyrogenic hydrolysis apparatus to subject methyltrichlorosilane to pyrogenic hydrolysis according to a diffusion method with 0.45 $Nm^3$/h of dry air and 0.11 $Nm^3$/h of hydrogen gas which were also continuously fed to the pyrogenic hydrolysis apparatus.

The resulting fine particulate silica (fumed silica) was passed through an agglomerator and then collected in a cyclone. Fumed silica was produced at a rate of 280 g/h. The silica had a BET specific surface area of 200 m/g and a chlorine content of 5100 ppm.

All the collected silica was continuously fed by a pump to a purifying apparatus shown in FIG. 1 with 0.1 $Nm^3$/h of air preheated to 350° C. and 0.1 $Nm^3$/h of steam preheated to 350° C. to purify the silica in the same manner as in Example 1. The linear velocity in the column was 3.7 cm/sec. and the treating time was 4 minutes. The purified silica had a chlorine content of 10 ppm.

Comparative Example 1

The procedure of Example 1 was repeated except that the fluidized bed was maintained at a temperature of 300° C., 140 g/h of fumed silica, 0.25 $Nm^3$/h of air, and 0.05 $Nm^3$/h of steam were fed, and the treating time was 7 minutes. The thus purified fumed silica had a chlorine content of 68 ppm, indicating short deacidification.

Although some preferred embodiments have been described, many modifications and variations may be made thereto in the light of the above teachings. It is therefore to be understood that within the scope of the appended claims, the invention may be practiced otherwise than as specifically described.

We claim:

1. A method for purifying fine particulate silica comprising the steps of:

continuously feeding halide-bearing fine particulate silica, air and steam through an upright column from its bottom toward its top for forming a fluidized bed within the column at a gas linear velocity of 1 to 10 cm/sec. and a temperature of 250° to 400° C., the volume ratio of steam to air being at least 0.5/1, whereby steam causes the halide to be eliminated from the fine particulate silica, and removing the fine particulate silica from which the halide has been eliminated from the top of said column.

2. The method of claim 1 wherein the halide-bearing fine particulate silica is fumed silica having a BET specific surface area of 100 to 400 $m^2$/g and a chlorine content of 1,000 to 10,000 ppm and the resulting purified fumed silica has a chlorine content of 20 ppm or less.

3. The method of claim 2 wherein the halide-bearing fumed silica is one prepared by the process comprising the steps of:

(A) subjecting a gas stream consisting essentially of an organohalosilane or organohalodisilane to pyrogenic hydrolysis in a diffusion flame of a combustible gas and a free oxygen-containing gas, and (B) providing the combustible gas in a sufficient amount to the organohalosilane or organohalodisilane to continue combustion of the organohalosilane or organohalodisilane.

4. A method for purifying fine particulate silica comprising the steps of:

continuously feeding halide-bearing fine particulate silica and steam through an upright column from its bottom toward its top for forming a fluidized bed within said column at a gas linear velocity of 1 to 10 cm/sec. and a temperature of 250° to 400° C., whereby steam causes the halide to be eliminated from the fine particulate silica, and removing the fine particulate silica from which the halide has been eliminated from the top of said column.

5. The method of claim 4 wherein the halide-bearing fine particulate silica is fumed silica having a BET specific surface area of 100 to 400 $m^2/g$ and a chlorine content of 1,000 to 10,000 ppm and the resulting purified fumed silica has a chlorine content of 20 ppm or less.

6. The method of claim 5 wherein the halide-bearing fumed silica is one prepared by the process comprising the steps of:

(A) subjecting a gas stream consisting essentially of an organohalosilane or organohalodisilane to pyrogenic hydrolysis in a diffusion flame of a combustible gas and a free oxygen-containing gas, and (B) providing the combustible gas in a sufficient amount to the organohalosilane or organohalodisilane to continue combustion of the organohalosilane or organohalodisilane.

7. The method of claim 3, wherein said combustible gas is selected from the group consisting of hydrogen gas, methane, propane and gaseous methanol.

8. The method of claim 6, wherein said combustible gas is selected from the group consisting of hydrogen gas, methane, propane and gaseous methanol.

9. The method of claim 3, wherein said free oxygen-containing gas is air.

10. The method of claim 6, wherein said free oxygen-containing gas is air.

* * * * *